(12) United States Patent
Huschka et al.

(10) Patent No.: US 6,533,092 B2
(45) Date of Patent: Mar. 18, 2003

(54) METHOD OF DETECTING THE OPERATING STATE OF A FRICTION CLUTCH

(75) Inventors: Stephan Huschka, Ludwigsburg (DE); Oliver Rabus, Reichenbach (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/922,967

(22) Filed: Aug. 6, 2001

(65) Prior Publication Data

US 2002/0038747 A1 Apr. 4, 2002

(30) Foreign Application Priority Data

Aug. 5, 2000 (DE) .......................... 100 38 331

(51) Int. Cl.$^7$ .......................... B60K 41/02; F16D 23/02
(52) U.S. Cl. ............................ 192/53.34; 192/111 A; 477/174; 477/180
(58) Field of Search ....................... 192/53.34, 111 A; 477/174, 180

(56) References Cited

U.S. PATENT DOCUMENTS

| | | | | |
|---|---|---|---|---|
| 4,646,891 A | * | 3/1987 | Braun ..................... | 192/111 A |
| 5,337,868 A | * | 8/1994 | Liu et al. ................ | 477/74 |
| 5,337,874 A | * | 8/1994 | Oltean et al. ........... | 192/111 A |
| 5,411,124 A | * | 5/1995 | Olson ..................... | 192/103 R |
| 6,050,379 A | * | 4/2000 | Lyon ....................... | 192/54.1 |
| 6,113,515 A | * | 9/2000 | Salecker et al. ......... | 192/82 T |
| RE37,572 E | * | 3/2002 | Kremmling et al. ..... | 192/222 |

FOREIGN PATENT DOCUMENTS

DE     196 52 244     6/1997

* cited by examiner

*Primary Examiner*—Saul Rodriguez
(74) *Attorney, Agent, or Firm*—Kenyon & Kenyon

(57) ABSTRACT

In a method of detecting the operating state of a friction clutch which may be engaged and disengaged axially, as a result of being triggered by an actuation, an engagement point is determined from the parameters clutch engagement travel and associated clutch torque and/or associated clutch rotational speed, and its associated engagement travel is stored. In a method step independent of the actuations, a permissible maximum value of the engagement travel is stored. In a method step triggered by an actuation, a comparison is performed in which the engagement travel of the engagement point is compared with the permissible maximum engagement travel. In a method step which necessarily follows the method step relating to the comparison, if the engagement travel of the engagement point is greater than the permissible maximum engagement travel, a signal is displayed in order to be able to perform repairs.

4 Claims, 7 Drawing Sheets possible sequence for learning the original engagement point $s_{bo}$ for each gear

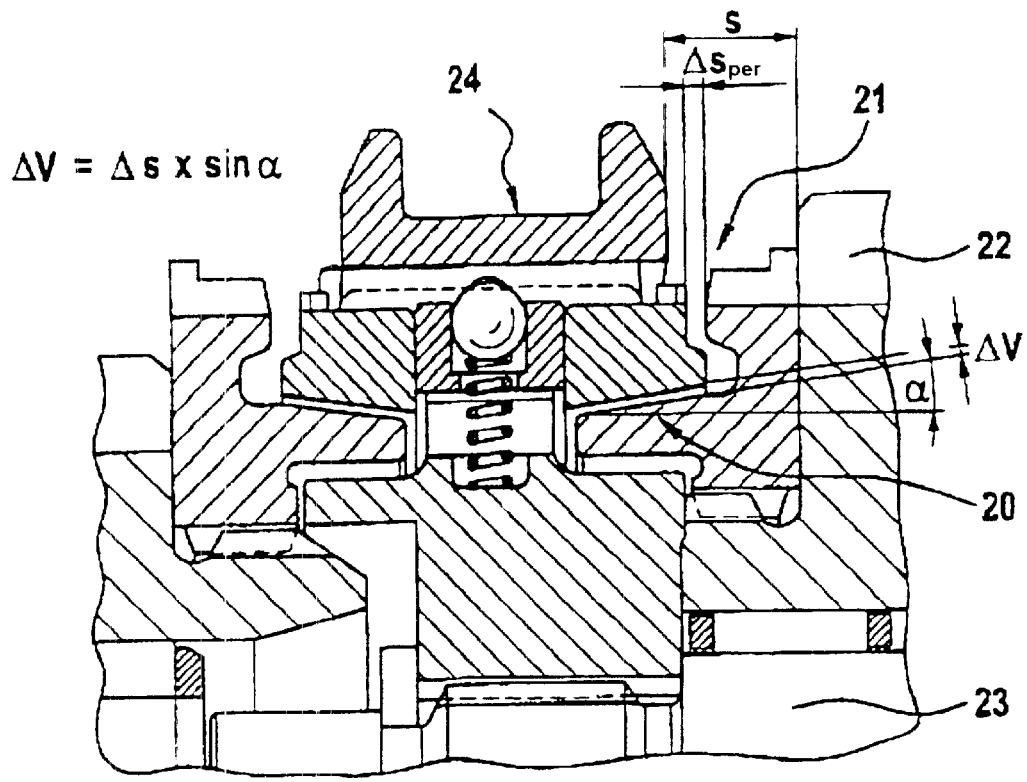
Figure 1: dimensions. $\Delta s$ wear travel, $\Delta s_{per}$ permissible wear travel incl. play; s gear-change travel on the changing sleeve; $\Delta V$ wear on the synchromesh ring; $\alpha$: cone angle
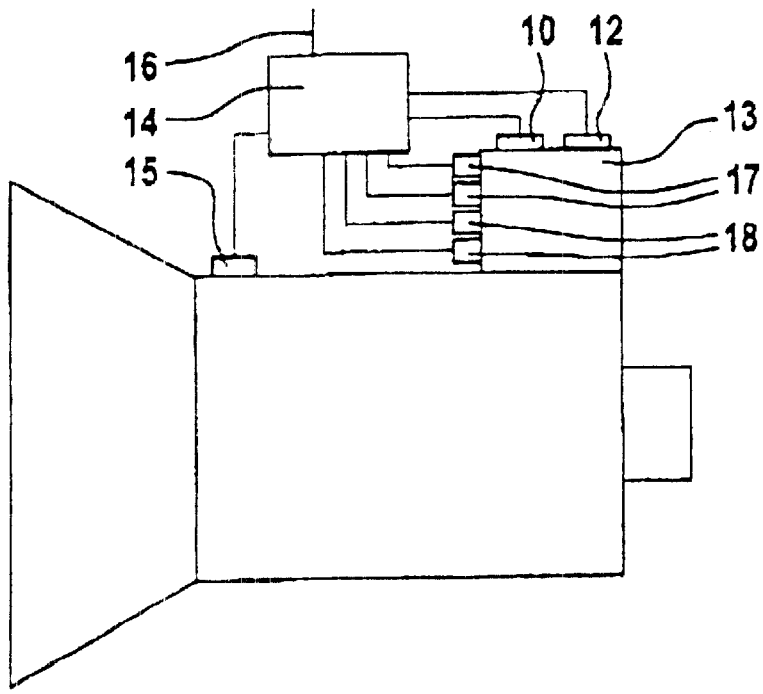
Figure 2

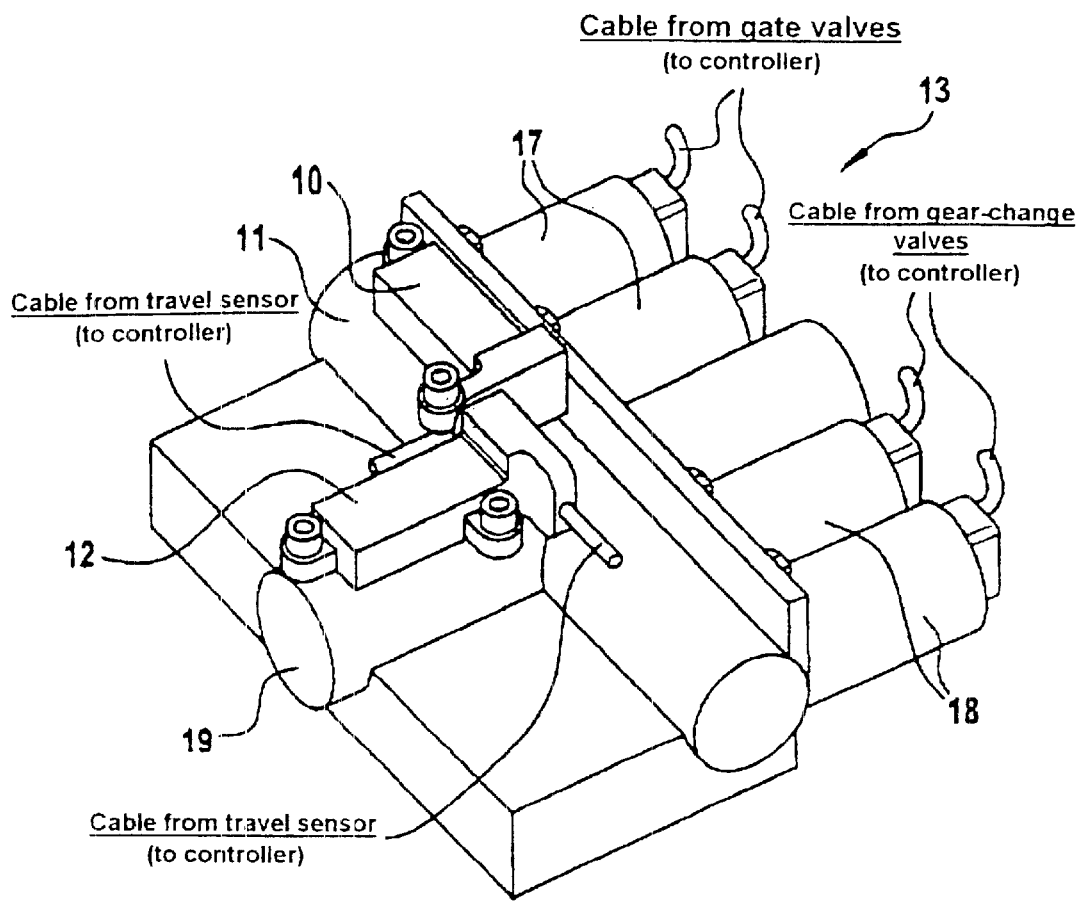
Figure 3: schematic construction of the actuator system incl. the sensor systems fitted there
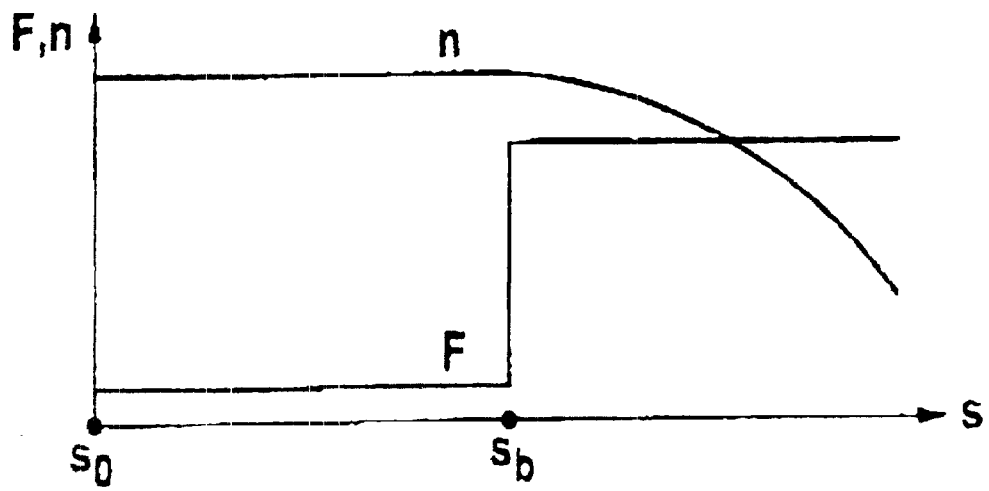
Figure 4: schematized force curve F and rotational speed curve n at the engagement point $s_b$

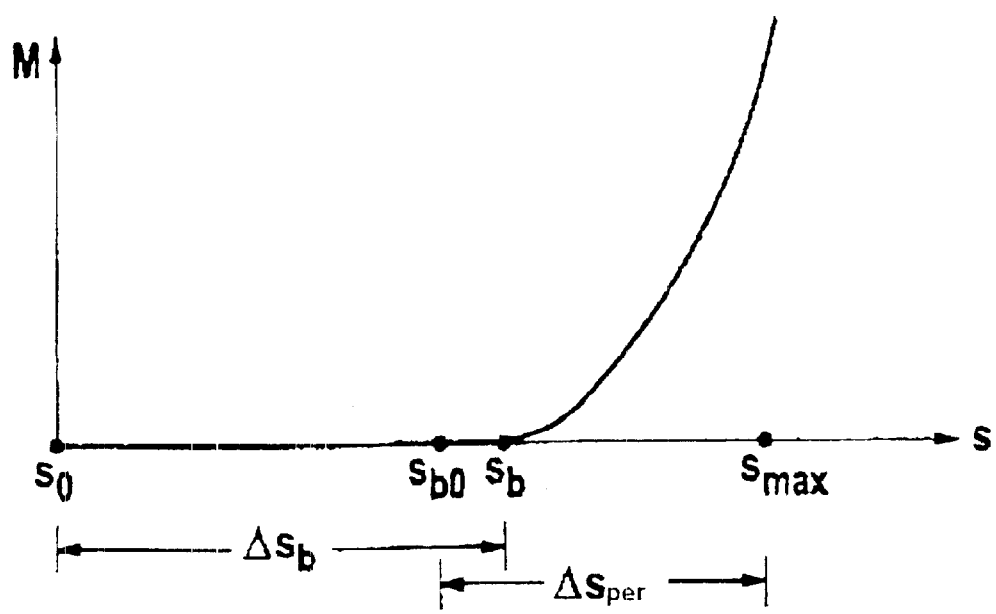
Figure 5: schematic representation of the engagement point $s_b$ of the synchronizing means

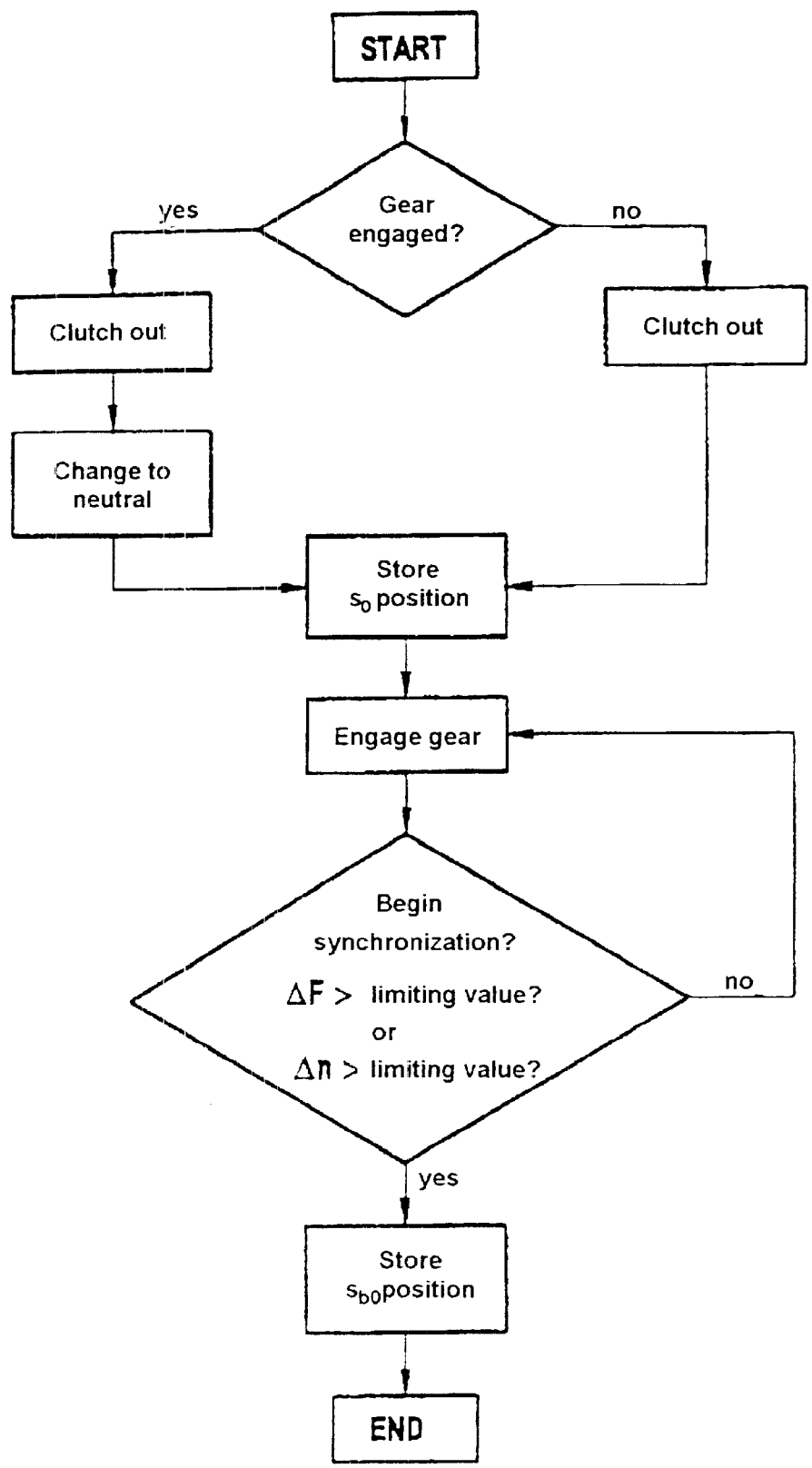
Figure 6: possible sequence for learning the original engagement point $s_{b0}$ for each gear

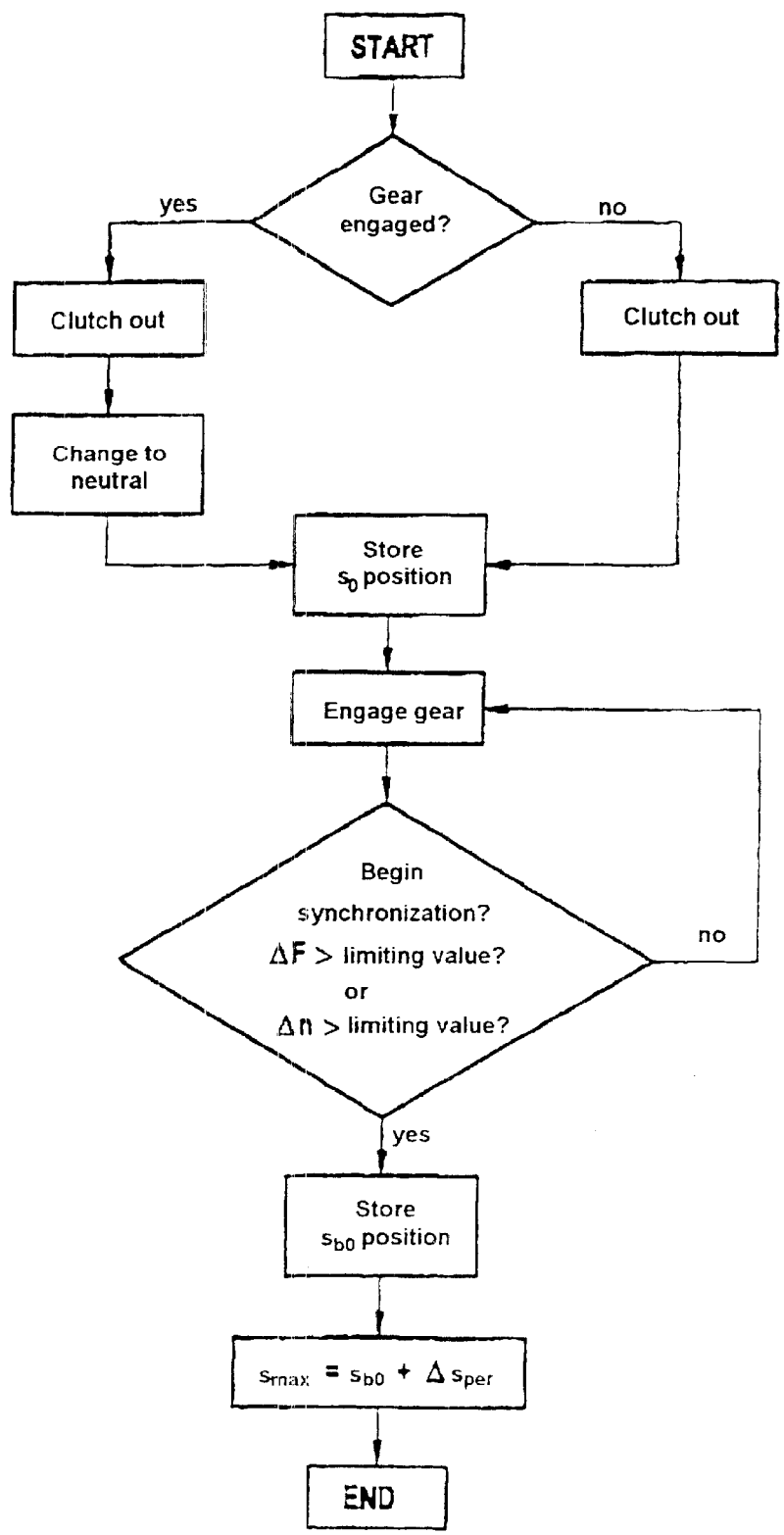
Figure 7: possible sequence for learning the maximum permissible wear point $s_{max}$ and original engagement point $s_{b0}$ for each gear

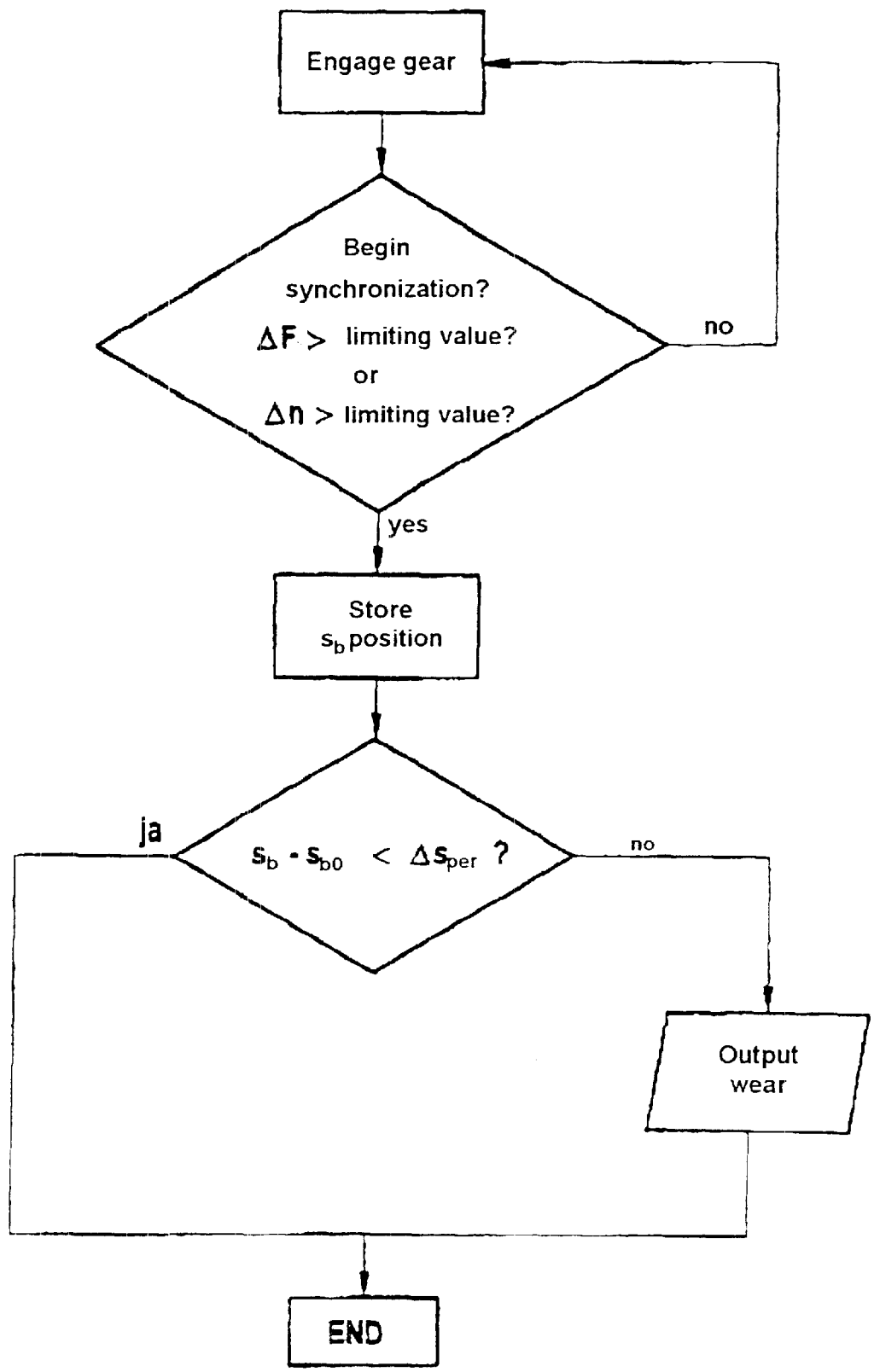
Figure 8: possible sequence for determining the wear by forming a difference

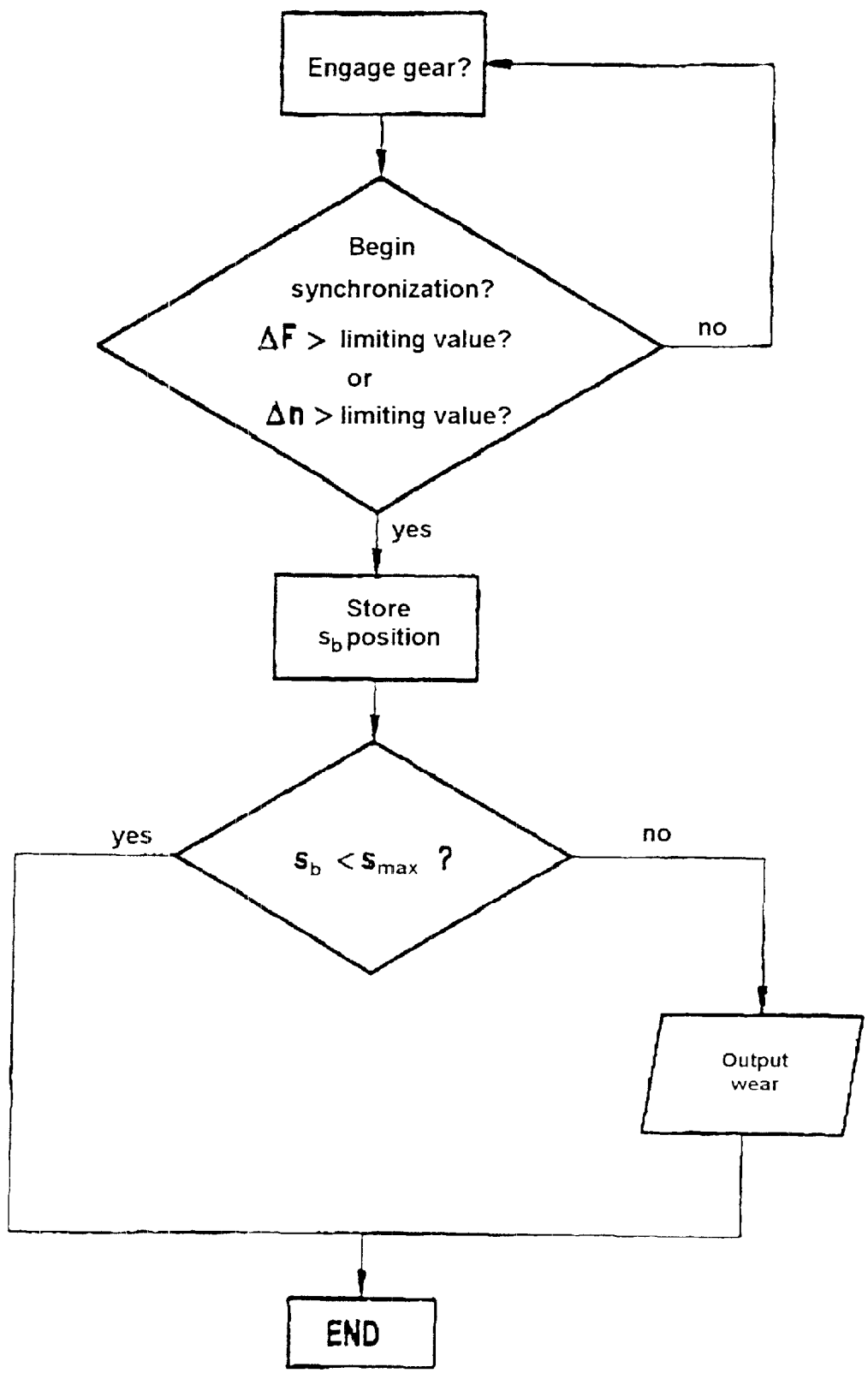
Figure 9: possible sequence for determining the wear by comparing values

METHOD OF DETECTING THE OPERATING STATE OF A FRICTION CLUTCH

FIELD OF THE INVENTION

The present invention relates to a method of detecting the operating state of a friction clutch.

BACKGROUND INFORMATION

German Published Patent Application No. 196 52 244 describes a method of detecting the operating state of a friction clutch, which is based on a clutch arranged in the power flow between a drive motor and a gearbox and the control of the torque that can be transmitted by such a clutch during the engagement and disengagement operations. In order to control such a clutch, the entire clutch characteristics must be known, presupposing knowledge of the clutch characteristic curve. In this conventional method, the knowledge of the engagement point, referred to as the grouping point, is critical to the extent that the engagement point of a clutch characterizes the point of engagement or the engagement travel at which the transmission of torque begins. Therefore, given knowledge of the engagement point, the clutch characteristics are also substantially known. In this method, measures are taken to account for deviations between the actual physical engagement point and the stored engagement point, the deviations arising due to long-term wear phenomena and/or short-term changes in operating conditions, such as temperature changes, etc., in an adaptive manner for the control.

It is an object of the present invention to provide a method of detecting the operating state of a friction clutch for more complex torque transmission assemblies, such as torque converters, in particular step-change gearboxes which operate with friction clutches which may be engaged and disengaged axially, to permit lifetime monitoring with regard to wear, in order to perform repairs in good time and thus to avoid expensive consequential damage.

SUMMARY

The above and other beneficial objects of the present invention are achieved by providing a method as described herein.

In the method according to the present invention, the engagement point of the clutch—established during the first or a subsequent actuation—is determined, however, during each actuation or each second actuation or each third actuation or each nth actuation, and in each case its associated engagement travel is compared with a maximum permissible value until finally, when the maximum permissible value is reached, a signal is displayed, so that repairs may be performed.

For safety reasons, it may be advantageous to use the method according to the present invention as early as in the new state of the assembly operating with at least one friction clutch, it being possible for the maximum permissible engagement travel to be predefined as the permissible differential travel and to be used for the comparison.

The method according to the present invention may be advantageous in particular in the case of synchronized step-change gearboxes. In this case, the engagement point of the new gearbox may be registered for each gear during initial commissioning, and the engagement travel relating thereto may be stored over the lifetime. Thereafter, this engagement point over its engagement travel is continuously compared with the "new" value during each further gearshift operation, and the wear travel is thus determined. If this value exceeds the stored permissible wear value, this condition is displayed by the diagnostic system and repairs are performed.

The present invention may also be advantageous with respect to monitoring the synchronization wear by changing the frictional value not being possible, since modern synchronizing systems maintain a virtually constant frictional value over their entire lifetime. A sharp change in the frictional value is only encountered in the case of complete wear of the friction lining.

In current step-change gearboxes, in which the gear-changing operations may also even be performed under automatic control, use is generally made of blocking synchronizing devices as an advance friction clutch for equalizing the rotational speed by transmitting force, which, by a blocking device, permits the gear to be engaged in a form-fitting manner only after the sychronizing operation has been completed. These blocking synchronizing devices may be constructed as single-cone, double-cone or multiple-cone synchronizing devices. The method according to the present invention may be applied to all such synchronizing devices in which wear may be detected via the clutch travel.

BRIEF DESCRIPTION OF THE DRAWINGS

FIG. 1 is a cross-sectional view of a single-cone synchronizing device.

FIG. 2 is a schematic view of a gearbox construction configured to perform the method according to the present invention.

FIG. 3 is a schematic view of an actuator system having a valve unit and a sensor system of the gearbox illustrated in FIG. 2.

FIG. 4 illustrates a graph relating to the definition of the engagement point. FIG. 5 illustrates a graph relating to the definition of the maximum permissible engagement travel.

FIG. 6 illustrates a flowchart of a method for determining the engagement travel of the original engagement point.

FIG. 7 illustrates a flowchart of another method for determining the engagement travel of the original engagement point.

FIG. 8 illustrates a flowchart of the method according to the present invention in which, in a method step relating to the comparison—starting from the original engagement point in the new state of the gearbox—differences in travel are compared with one another.

FIG. 9 illustrates a flowchart of a method in which, in a method step relating to the comparison, the engagement travel of the currently determined engagement point is compared with the maximum permissible value.

DETAILED DESCRIPTION

FIG. 1 illustrates the construction of a single-cone synchronizing device. On a shaft 23 of a gearbox, a gear 22 is mounted such that it may rotate but cannot be displaced axially, and a sliding sleeve 24 is mounted so that it rotates with the shaft and may be displaced axially. Gear 22 and sliding sleeve 24 may be coupled to each other in a conventional manner by a form-fitting gear clutch 21, together with axial displacement of the sliding sleeve. In order to equalize the rotational speed of the gear 22 to the rotational speed of the shaft 23, a synchronizing clutch 20 in the form of a friction cone clutch is provided, which includes an outer cone arranged immovably in relation to the gear 22 and an inner cone which may be moved rotationally and axially to a limited extent in relation to the shaft and which, before the engagement of the gear clutch 21, comes into engagement with the outer cone as a result of its actuation by the sliding sleeve 24.

In general, the wear of the frictional surfaces is the determining factor of the lifetime of synchronizing devices. The maximum wear $\Delta V_{max}$ is generally approximately 0.15 mm in the case of a cone synchronizing device. The permissible wear travel $\Delta S_{max}$ is generally 1.0 to 1.5 mm and is related to the wear via the function $\Delta V = \Delta s \times \sin \alpha$.

FIGS. 2 and 3 schematically illustrate a gearbox construction which may be used for implementing the method according to the present invention. Various components for implementing wear monitoring according to the present invention are built onto an actuator system 13. A travel sensor 10 is used to determine the position and change in travel of the actuating pistons 11 responsible for the gate selection. These actuating pistons 11 are driven by hydraulic oil via two valves 17. A further travel sensor 12 is used to determine the current position and change in travel of the actuating pistons 19 responsible for the gear changing. These actuating pistons 19 are driven by hydraulic oil via proportional valves 18, in which the pressure is proportional to the current applied. The actuating pistons 19 driven in this manner are engaged with the selector rails and therefore also with the sliding sleeves for actuating the synchronizing clutches. The data determined by the travel sensors 10 and 12 and by a rotational speed sensor 15 for the gearbox input speed are processed in an electronic controller 14, together with further information 16 from the vehicle electronics in the controller 14.

According to the graph illustrated in FIG. 4, the engagement point of the synchronizing device is defined as the engagement travel $S_b$ at which the synchronizing operation begins, i.e., torque is transmitted. This condition is associated with a rise in power for the gear-changing operation and with a change in the rotational speed of the gearbox. There are therefore two possibilities for determining the engagement travel $S_b$ of the engagement point:

1. Via the change in the level of force during the gear change (detected via the proportional pressure valves 18)
2. Via the change in rotational speed of the gearbox (detected via the speed sensor 15).

According to the graph illustrated in FIG. 5, the distance covered $\Delta S_b$ is given as the difference between the engagement travel $S_b$ and the neutral position $S_0$ of the gearbox. With increasing wear on the synchronizing device, the engagement travel $S_b$ of the engagement points moves in the direction of the maximum permissible wear travel $S_{max}$, which is given by the engagement travel $S_{b0}$ of the original engagement point and the permissible wear travel $\Delta S_{per}$ to be added.

According to the flow chart illustrated in FIG. 6, during initial commissioning of the new gearbox, the engagement travel $S_b$ of the engagement point of the synchronizing device for each gear may be registered and, over the lifetime, may be stored as the original engagement travel $S_{b0}$ in the memory of the controller 14.

According to the flow chart illustrated in FIG. 7, an additional method step for the definition and storage of a maximum permissible engagement or wear travel $S_{max}$ may follow, this being predefined by the sum expression $S_{b0} + \Delta S_{per}$ in accordance with the foregoing explanations relating to FIG. 5.

According to the flow chart illustrated in FIG. 8, the current value $S_b$ of the engagement travel of the respective engagement point during each gear-changing operation may be compared with the value $S_{b0}$ determined during initial commissioning. If the difference between $S_b$ and $S_{b0}$ exceeds the permissible wear travel $\Delta S_{per}$, this condition may be displayed via the diagnostic system, and repairs to the gearbox may be performed.

According to the flow chart illustrated in FIG. 9, the current value $S_b$ of the engagement travel of the respective engagement point during each gear-changing operation may be compared directly with the maximum permissible engagement or wear travel $S_{max}$ defined in accordance with FIG. 5. If the current value $S_b$ exceeds the permissible wear travel $S_{max}$, this condition may be displayed via the diagnostic system and repairs to the gearbox may be performed.

What is claimed is:

1. A method of detecting an operating state of a friction clutch, the friction clutch being axially engageable and disengageable and, over a relatively long time period substantially limited by its lifetime, being subjected to a large number of actuations, the actuations including a disengagement operation and a subsequent engagement operation, the method comprising the steps of:

(a) in accordance with an actuation, determining an engagement point from a clutch engagement travel, at least one of associated clutch torque and associated clutch rotational speed and storing an associated engagement travel;

(b) independent of an actuation, defining and storing a permissible maximum value of the engagement travel;

(c) in accordance with an actuation, comparing the engagement travel of the engagement point with the permissible maximum engagement travel;

(d) displaying a signal in accordance with the comparing the engagement travel step (c) if the engagement travel of the engagement point is greater than the permissible maximum engagement travel; and (e) if the engagement travel of the engagement point is less than the permissible maximum engagement travel, during subsequent actuations, cyclically repeating the determining step (a), comparing the engagement travel step (c) and displaying a signal (d) until an actuation that results in the signal being displayed.

2. The method according to claim 1, further comprising the step of defining the permissible maximum value of the engagement travel as a permissible differential travel by which an original engagement travel of the engagement point determined by an initial actuation is increasable.

3. The method according to claim 2, further comprising the step of (f) comparing the permissible differential travel with a differential travel defined in accordance with an engagement travel of the engagement point by a later actuation and an engagement travel of the engagement point by an initial actuation, the comparing the permissible differential travel step (f) being performed in accordance with an actuation and being performed later than an initial actuation.

4. The method according to claim 1, wherein the friction clutch includes a synchronizing clutch, the synchronizing clutch being arranged in a power flow parallel to and, with respect to a travel-dependent actuation during engagement, in front of a form-fitting gear clutch configured to couple a gear to a shaft, the synchronizing clutch being actuatable by a sliding sleeve providing the form-fit with the gear clutch during engagement, the determining step (a) being performed in accordance with the actuation of the sliding sleeve, the sliding sleeve being fixed to the shaft so that the sliding sleeve is rotatable with the shaft and is axially displaceable with respect to the sleeve to engage the gear clutch.

* * * * *